Dec. 2, 1941.   E. L. HARDER   2,265,039
BROAD RANGE LINEAR RECTIFICATION
Filed Feb. 20, 1940

A.C. Voltage

WITNESSES:
C. J. Weller.
David Kreider.

INVENTOR
Edwin L. Harder.
BY
ATTORNEY

Patented Dec. 2, 1941

2,265,039

UNITED STATES PATENT OFFICE 2,265,039

BROAD RANGE LINEAR RECTIFICATION

Edwin L. Harder, Forest Hills, Pa., assignor to Westinghouse Electric & Manufacturing Company, East Pittsburgh, Pa., a corporation of Pennsylvania Application February 20, 1940, Serial No. 319,870

10 Claims. (Cl. 175—294)

My invention relates to electric alternating-current rectification and it has particular relation to a rectification system whereby a direct current relay coil may be provided with an operating torque which is linearly related to the applied alternating voltage over a wide range of variation.

The field of application of many protective relay arrangements is restricted by the zone over which approximately linear conversion from alternating current to direct current may be obtained with practical rectifying units. The copper-oxide dry type rectifier has a number of properties which make it practical for such service. However, this type of rectifier, because of such factors as its resistance characteristics, will supply substantially linear conversion over only a limited range of variation. Consequently, such a device, arranged as taught by the prior art, is inapplicable where a proportional response is required over a relatively large range.

It is, accordingly, an object of my invention to provide a system which will supply substantially linear alternating voltage to direct-current rectification over a wider range of variation than is otherwise attainable.

Another object of my invention is to provide a system whereby broad range linear rectification may be obtained from a plurality of units which individually have a much more narrow range of linearity.

More specifically stated, it is an object of my invention to provide a rectification arrangement which will supply ampere turns on a direct current relay coil substantially linearly related to the applied alternating voltage over a wide range of variation.

According to my invention, I provide a circuit comprising a plurality of rectifier units connected across the alternating energy supply in such manner that the sum of the outputs thereof furnishes substantially linear rectification over a wide range. A first rectifier furnishes a current output linearly related to the alternating voltage over a portion of the range of variation of that voltage. A second rectifier may be supplied from the alternating voltage source through a saturable transformer whereby it furnishes a linearly related output current over another portion of the range of variation of the voltage and up to the point of saturation of the transformer. If it is desired to still further extend the straight line relationship, additional rectifier units may be provided.

Other objects of my invention will become evident from the following detailed description, taken in conjunction with the accompanying drawing, in which.

Figure 1:
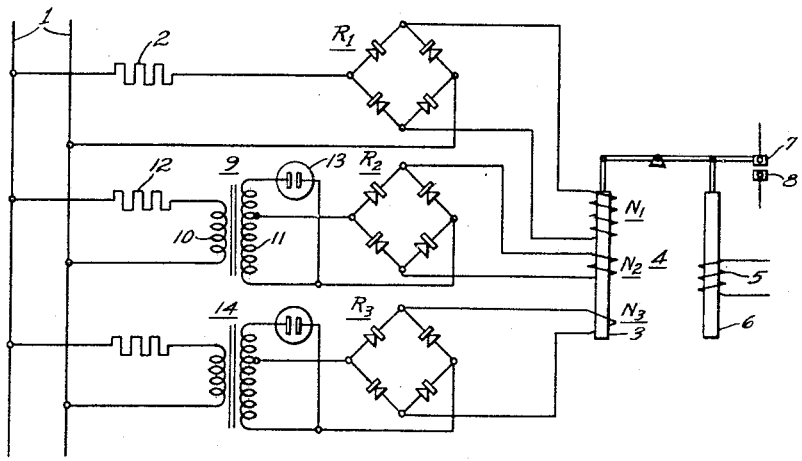
Figure 1 shows diagrammatically a preferred form of my invention adapted for control of an electric relay.

The apparatus shown in Fig. 1 comprises a pair of conductors 1 energized by an alternating current of variable potential and having a copper-oxide bridge type full wave rectifier or Rectox unit $R_1$ connected thereto through a current limiting resistance 2. Connected to the output side of the Rectox $R_1$ is a winding $N_1$, acting on the restraining armature 3 of a relay 4 which has an operating winding 5 acting on an armature 6 to close a pair of contacts 7 and 8.

A second Rectox unit $R_2$ having substantially the same operating characteristics as the unit $R_1$ is connected to the conductors 1 through a saturable step-up transformer 9 having a primary winding 10 and a secondary winding 11. A resistance 12 is placed in series with the primary winding 10 while a protective neon lamp 13 is connected in parallel with the secondary winding 11. A second restraining winding $N_2$ having fewer effective turns than the winding $N_1$ is operatively located near the armature 3 and energized from the direct-current side of the Rectox $R_2$.

To further extend the range of linear rectification a third Rectox unit $R_3$, connected to the alternating voltage conductors 1 through a saturable transformer 14 having a higher step-up ratio than the transformer 9 may be employed to supply direct current to a third restraining winding $N_3$ on the relay 4.

Figure 2:
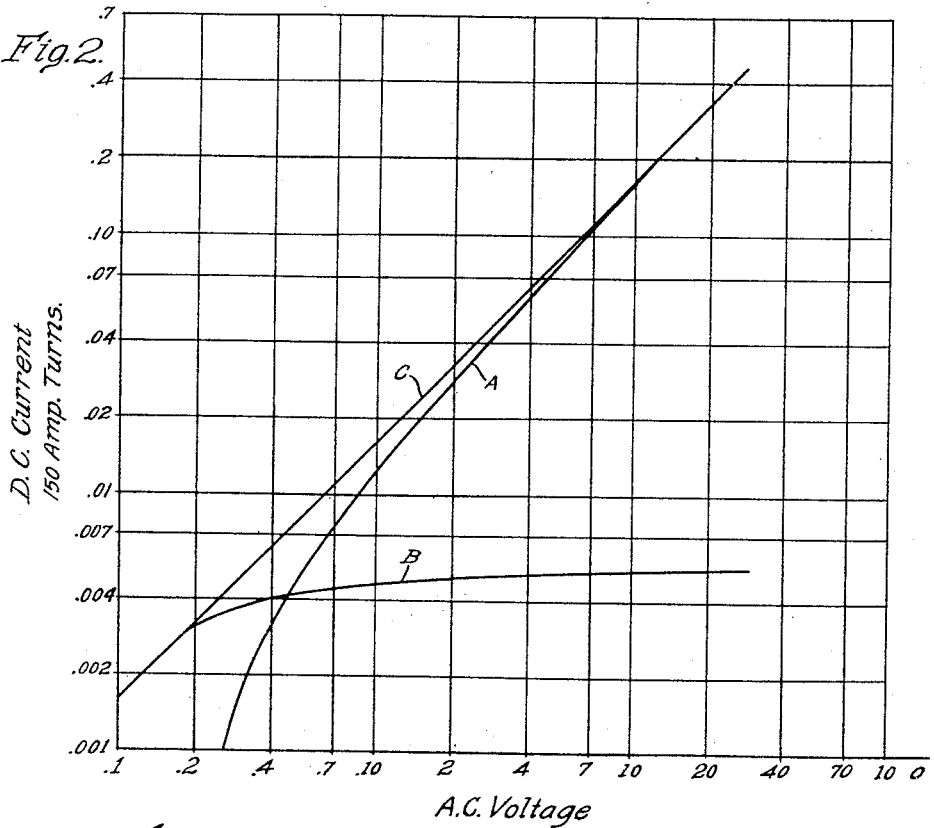
Fig. 2 is a logarithmic graph showing the extent of linearity of an ordinary contact rectifier and the effect of my invention thereon.

Curve A of Fig. 2 shows the variation of the direct current output of the rectifier unit $R_1$ into the winding $N_1$ plotted against the alternating voltage applied to the rectifier. It will be noted that over a 10 to 1 range, that is from 10 volts to 1 volt alternating current, the relationship with the rectified current departs from linear by not more than ten per cent. However, if a range of 13 to 1 or 10 volts to .7 volts is required the departure from a linear relationship amounts to twenty per cent. As the working range is broadened the departure from linearity increases rapidly until the limit of the range is determined by the maximum permissible voltage on the rectifiers.

In order to illustrate the invention by way of a specific example, a description is here given of apparatus suitable for obtaining a linear response over a ratio of 100 to 1 using rectifier units having the characteristics shown in curve A of Fig. 2. Up to its point of saturation, the transformer 9 supplies the Rectox $R_2$ with a voltage equal to ten times that applied to the Rectox $R_1$. Thus at the lower alternating voltages, the direct current supplied by the Rectox $R_2$ is equal to that corresponding to ten times the voltage in the alternating energy conductors 1 as shown in curve A of Fig. 2. The coil $N_2$, however, has but ten per cent as many turns as $N_1$. For example, where the alternating voltage is .2 the current through the winding $N_2$ will be equal to that flowing through $N_1$ when the alternating voltage is 2; and, since $N_1$ has ten times as many turns as $N_2$, the ampere turns acting through $N_2$ will be equal to ten per cent of those produced by $N_1$ at 2 volts across the conductors 1. Since $R_1$ furnishes straight line rectification from 1 to 10 volts, as shown by curve A of Fig. 1, a substantially linear relationship between the alternating voltage and the ampere turns provided by the winding $N_2$ will be obtained for alternating voltages below one volt across the conductors 1.

Preferably the saturation point of the transformer 9 is selected so that its maximum secondary voltage occurs at an alternating voltage approximating that at which linear relationship to the direct current output of Rectox $R_1$ begins. Iron such as that shown in Patent 1,807,021 and marketed under the trade-mark "Hipernik," which has sharp saturation properties at low voltage and with which a ceiling voltage not over 50 per cent above the threshold of saturation may be secured, has been found suitable for use as the core material.

It will be noted that curve A of Fig. 2 also shows the relationship of the ampere turns supplied through the Rectox $R_1$ to the alternating voltage since the number of turns is constant. Curve B of this figure shows the ampere turns supplied by $N_2$ when it is energized through Rectox $R_2$ plotted against the alternating voltage across conductors 1. Curve C wherein the sum of the ampere turns supplied by windings $N_1$ and $N_2$ is plotted shows that a substantially straight line relationship exists over a range of 100 to 1.

By providing the third Rectox $R_3$, operating in accordance with the principles above disclosed, to supply rectification over still another portion of the range of variation of the alternating voltage, the linear range may be still further extended. It will be understood that the invention is in no way limited to the above circuit constants which were assigned merely by way of example to more clearly illustrate its principles.

Figure 3:
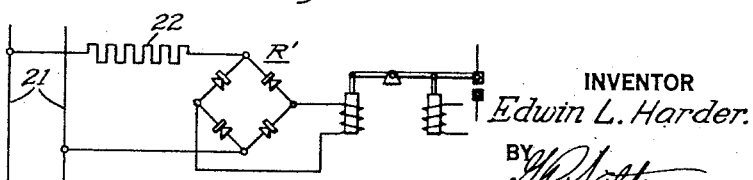
Fig. 3 is a diagrammatic representation of a modified form of my invention.

Fig. 3 illustrates a modification of my invention wherein a copper-oxide bridge type rectifier unit or Rectox R' is supplied by variable alternating voltage conductors 21 through a large valued series impedance or resistance 22.

The alternating voltage across the Rectox R' will be equal to the variable alternating voltage across the conductors 21 less the voltage drop across the impedance 22. The impedance of the Rectox unit R', which is substantially resistive, does not remain constant but varies to some extent with increased alternating voltage impressed thereon with the result that the range of linear response is limited. By making the impedance 22 relatively high as compared to the impedance of the Rectox, it is possible to greatly reduce the adverse effect of this impedance variation on the range of linear proportionality between the alternating voltage and direct current output.

Where efficiency is not of prime importance, the principles described in conjunction with Fig. 3 may be embodied in the apparatus of Fig. 1. In such a case the resistance 2 may have a high value such as will increase the range of linear proportionality of the Rectox $R_1$. The Rectox units $R_2$ and $R_3$ may be utilized in accordance with the invention and high impedances may be employed with them if desired.

Although I have shown and described certain specific embodiments of my invention, and have, in some instances, suggested specific transformer ratios and other circuit-constants as examples for purposes of explanation I am fully aware that many modifications thereof are possible. My invention, therefore, is not to be restricted except insofar as is necessitated by the prior art and by the spirit of the appended claims.

I claim as my invention:

1. A rectification system comprising a plurality of rectifier units, variable alternating voltage means supplying said rectifier units, means for modifying the alternating voltage supplied to at least one of said rectifier units to a substantially constant multiple of said variable alternating voltage through a portion of the range of variation thereof and to a substantially constant value through another portion of said range of variation and means responsive to the direct current outputs of said rectifier units.

2. A rectification system comprising a plurality of rectifier units, the normal range of linear operation of each of said units being limited to a portion only of its total operating range, variable alternating voltage means supplying said rectifier units, means for modifying the alternating voltage applied to at least one of said rectifier units to a substantially constant multiple of said variable alternating voltage through a portion of the range of variation thereof and to a substantially constant value through another portion of said range of variation, and a plurality of windings, each of said windings being energized from the direct current side of one of said rectifier units and at least one of said windings having a different number of effective turns from the other of said windings.

3. A rectification system comprising a plurality of rectifier units, variable alternating voltage means supplying said rectifier units, saturable transformer means in the alternating current side of at least one of said rectifier units, and a plurality of windings, each of said windings being energized from the direct current side of one of said rectifier units and at least one of said windings having a different number of effective turns from the other of said windings.

4. A rectification system comprising a pair of contact rectifier units, variable alternating voltage means supplying said rectifier units, means for modifying the alternating voltage applied to one of said rectifier units to a substantially constant multiple of said variable alternating voltage through a portion of the range of variation thereof and to a substantially constant value through another portion of said range of variation, a winding energized from the direct-current side of the said rectifier unit which is supplied through said modifying means, and a winding energized from the direct current side of said other rectifier unit, said second winding having effective turns substantially equal to the product of said constant multiple and the turns of said first winding.

5. A rectification system comprising a pair of rectifier units, the normal range of linear operation of each of said units being limited to a portion only of its total operating range, alternating voltage means supplying said rectifier units, saturable transformer means having a step-up ratio and connected in the alternating current side of one of said rectifier units and a pair of windings having different effective turns in substantially the same ratio as said step-up ratio of said transformer means, said winding having the smaller of said effective turns being energized from the direct-current side of said rectifier unit which is connected through said transformer means and the other of said windings being energized from the direct-current side of said other rectifier unit.

6. A rectification system comprising a pair of rectifier units, variable alternating voltage means supplying said rectifier units, a saturable transformer including a secondary winding connected across the alternating current side of at least one of said rectifier units, a protective neon lamp connected across at least a portion of said secondary winding, and a plurality of direct-current windings, each of said direct-current windings being energized from the direct-current side of one of said rectifier units and at least one of said direct-current windings having a different number of effective turns from the other of said direct-current windings.

7. In a rectification system for operation with a relay, a plurality of contact rectifier units, variable alternating voltage means supplying said rectifier units, saturable transformer means in the alternating-current side of at least one of said rectifier units, a relay and a plurality of windings controlling said relay, each of said windings being energized from the direct-current side of one of said rectifier units and at least one of said windings having a different number of effective turns from the other of said windings.

8. A rectification system comprising variable alternating voltage means, a pair of substantially similar rectifier units, the first of said rectifier units being supplied from said variable alternating voltage means and arranged to give straight line rectification over a portion of the range of variation thereof, a saturable transformer supplied by said alternating voltage means, said transformer being arranged to supply the second of said rectifier units with an alternating voltage equal to such multiple of said variable alternating voltage that said second rectifier unit provides straight line rectification through a range of values of said variable alternating voltage means lower than and substantially adjoining said first named range of variation, said transformer being saturable at substantially the lower end of said range of straight line rectification of said first rectification unit, and a pair of windings the effective turns of which differ by substantially said transformer multiple, the said winding having the larger number of effective turns being energized from the direct-current side of said first rectifier unit and the other of said windings being energized from the direct-current side of said second rectifier unit.

9. A rectification system comprising a plurality of contact rectifier units, variable alternating voltage means supplying said rectifier units, high impedance means in series circuit with the alternating current side of at least one of said rectifier units to increase its range of linear rectification to direct current, means for modifying the alternating voltage applied to at least one of said rectifier units to a substantially constant multiple of said variable alternating voltage through a portion of the range of variation thereof and to a substantially constant value through another portion of said range of variation, and a plurality of windings, each of said windings being energized from the direct current side of one of said rectifier units and at least one of said windings having a different number of effective turns from the other of said windings.

10. A rectification system comprising a pair of contact rectifier units each of which provides a substantially linearly proportional output for only a predetermined range of alternating voltage impressed thereon, a variable alternating voltage source, means for energizing the first of said rectifier units with a voltage linearly proportional to said voltage source and falling within its range of linear output for a predetermined range of variation of the source voltage, means for energizing the second of said rectifier units with a voltage linearly proportional to said voltage source and falling within its range of linear output for a second predetermined range of variation of the source voltage adjoining said first predetermined range of variation thereof and with a substantially constant voltage while the source voltage lies within said first predetermined range, and means for combining the outputs of said rectifiers to provide a quantity substantially linearly proportional to said voltage source over both said predetermined ranges of variation thereof.

EDWIN L. HARDER.